Aug. 20, 1957 O. A. BAKER 2,803,309
APPARATUS FOR ELIMINATING PRODUCTS OF COMBUSTION
Filed Jan. 17, 1956
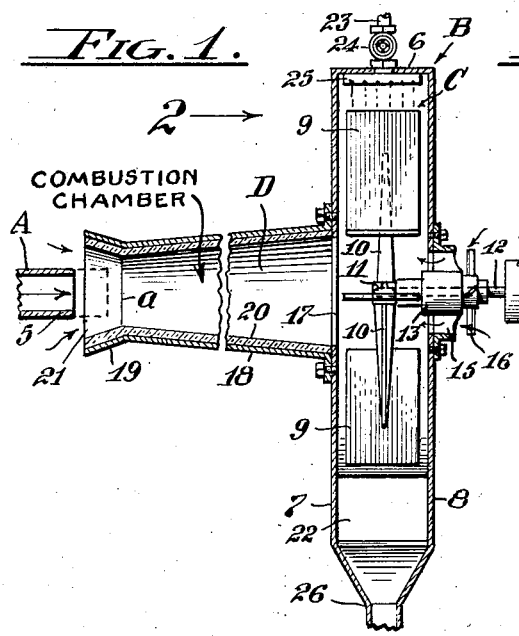
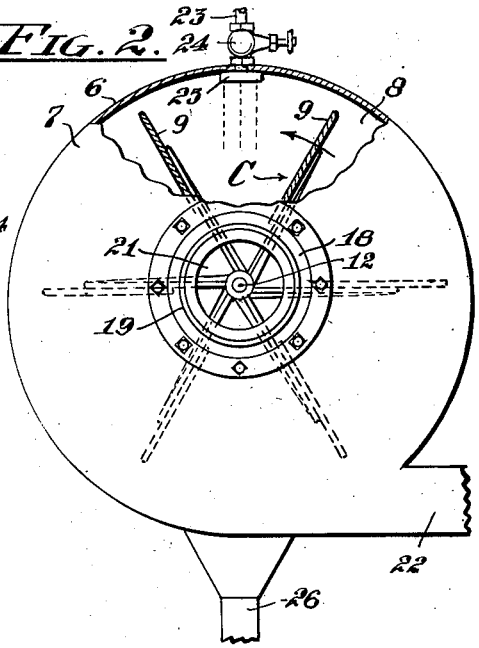
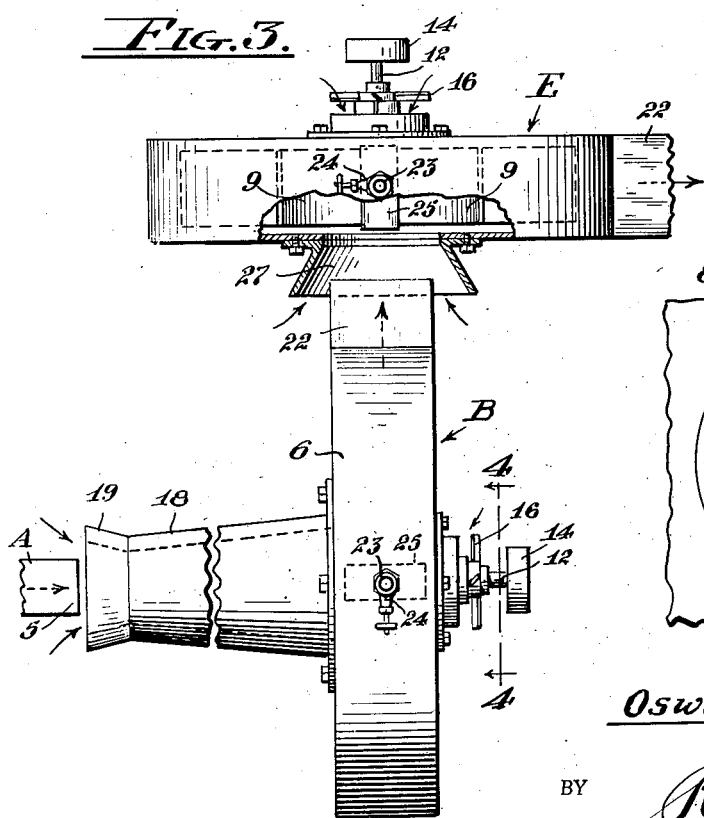
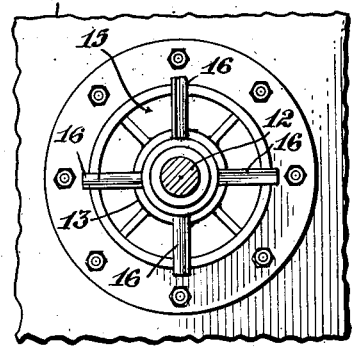
INVENTOR
Oswell A. Baker;
BY
ATTORNEY 2,803,309
Patented Aug. 20, 1957

2,803,309

APPARATUS FOR ELIMINATING PRODUCTS OF COMBUSTION

Oswell A. Baker, El Monte, Calif.

Application January 17, 1956, Serial No. 559,684

5 Claims. (Cl. 183—6)

This invention relates to an apparatus for eliminating certain deleterious products of combustion and has as its primary object the provision of a means whereby noxious water soluble gases, vapors and fumes together with suspended carbon particles resulting from the combustion of matter may be prevented from intermixture with the atmosphere to thereby aid in the elimination of smog and the delivery of deleterious gases of combustion into atmosphere.

A purpose of the invention is to provide an appliance for the smoke vents or flues of stoves, furnaces, incinerators and other fuel burning devices to take the place of smoke-stacks, chimneys and the like now generally employed as a means for carrying off products of combustion and discharging them into atmosphere as well as for inducing draft, the invention contemplating the disposition of combustion products in a fashion whereby in many instances the use of smoke-stacks and chimneys may be eliminated.

A particular object of the invention is to provide an apparatus which is applicable to a smoke vent or flue and which is operable to induct hot products of combustion therefrom and effect their admixture with air from surrounding atmosphere in a fashion to initially effect burning of combustibles contained therein and subsequently effect a cooling and consequent contracting action on resulant gases and vapors, and in which the gaseous and vaporous content of the products of combustion is subjected to a washing and cooling action by atmospheric air and unvaporized water in a manner to separate suspended solid particles from the mixture of gases and at the same time cause collection in the water of separated solids and the absorption in the water of water soluble noxious gases and vapors and carried to discharge thereby whereby certain portions of the products of combustion are captured and prevented from flowing to atmosphere.

Another object is to provide a smoke neutralizing apparatus in which the hot gases generated by combustion of matter may be readily reduced to atmospheric temperature by the admixture therewith of cool air and cold water whereby carbon gases and acid gases that are soluble in water will be rapidly absorbed in the water and together with solid particles contained in the gases be drawn off in the water and thereby be prevented from flowing to atmosphere.

Another object is to provide an apparatus of the above character which embodies a unit which is adapted to be arranged in a series of successive units of two or more units whereby any solids, gases and vapors exhaled from one unit may be subjected to the action of a succeeding unit, and whereby the capacity of an apparatus may be readily increased by the simple expedient of adding additional units.

A further object is to provide an apparatus for the purpose specified which is simple in construction and highly efficient and economical in operation.

With the foregoing objects in view together with such other objects and advantages as may subsequently appear, the invention resides in the parts and in the combination, construction and arrangement of parts hereinafter described and claimed, and illustrated by way of example in the accompanying drawing, in which:

Fig. 1 is a view of the apparatus as seen in vertical section with parts in elevation; showing it as applied:

Fig. 2 is a view in elevation as seen in the direction of the arrow 2 in Fig. 1; with parts broken away:

Fig. 3 is a plan view of the apparatus showing it as applied and as embodying a series of two tandem units:

Fig. 4 is a detail in section and elevation taken on the line 4—4 of Fig. 3: showing the blower air intake.

Referring to the drawings more specifically A indicates generally the smoke vent or flue of a furnace, stove, incinerator, or the like in which products of combustion are generated, and which vent or flue is here shown as cylindrical and leading horizontally with its outer end 5 opening to an intake of an apparatus embodying the invention.

In carrying out the invention, a conventional blower B is provided which blower embodies a housing having a cylindrical wall 6 arranged with its axis disposed horizontally; the blower having spaced parallel end walls 7—8 connected to the side edges of the wall 6.

Arranged in the blower housing is a revoluble fan C embodying blades 9 extending transversely between the walls 7—8 which blades are mounted on arms 10 connected to a hub 11 fixed on a shaft 12 journalled in a bearing 13 carried on the wall 8; the shaft extending into the blower housing above and parallel to the axis of the cylindrical wall 6 so that the fan blades 9 will travel eccentric to such wall. The outer ends of the blades 9 are arranged to move close to the upper portion of the inner periphery of the wall 6. The shaft 12 is fitted with a driving means, here shown as comprising a pulley 14, which means is connected to any suitable source of motive power in a usual manner.

The wall 8 is formed with an air inlet opening 15 which surrounds the bearing 13. The shaft 12 may be fitted with fan blades 16, as shown in Fig. 4, for impelling atmospheric air into the central portion of the blower housing around the bearing 13.

The blower C is provided with a circular intake opening 17 formed in the wall 7 axially concentric with the shaft 12 and opposite the opening 15. Leading from the opening 17 is a tapered intake conduit 18 of any suitable length having an outwardly flared open outer end portion 19 which is arranged to receive or open to the discharge outlet 5 of the vent or flue A in slightly spaced concentric relation thereto to provide an air intake opening 21 between the discharge end 5 of the vent or flue A and the flared intake end of the conduit 18 whereby on operation of the blower, air will be inducted from surrounding atmosphere into the conduit 18 together with hot products of combustion emitted from the vent or flue A.

The conduit 18 is of an inside diameter throughout exceeding that of the vent or flue A and is Venturi shaped with a throat $a$ slightly larger than the outside diameter of the open end 5 of the vent or flue A lying adjacent thereto so that the conduit 18 will act as an injector.

The interior of the conduit 18 constitutes in its entirety a combustion chamber D in which combustibles carried by products of combustion inducted or flowing into the conduit from the vent or flue A will be burned. The walls of the conduit 18 may be lined with a refractory covering 20.

Leading horizontally from the lower peripheral portion of the housing wall 6 tangentially thereof is a gas discharge conduit 22 the outer end of which opens to atmosphere or to the intake of a succeeding blower E' as shown in Fig. 3 and as will presently be described.

Leading to the upper portion of the blower housing is a water supply pipe 23 connecting with any suitable source of cold water supply under pressure through a regulating valve 24, which pipe opens to a sprinkler 25 on the interior of the housing wall 6 so as to direct streams of water downwardly into the path of travel of the blades 9. The bottom or lowermost portion of the blower housing is provided with a drain outlet pipe 26 through which water delivered to the housing from the pipe 23 flows to any suitable point of discharge which may be either to waste, such as a sewer system, or to a treatment plant.

It is contemplated to deliver cold water at normal temperatures into the path of travel of the revolving blades 9 in such volume as to be impacted by the blades and thereby maintain the blades sufficiently cool in the presence of hot gases within the blower that the blades will impact the water and drive it into the incoming gases without generation of steam which has been found to be detrimental to proper functioning of the apparatus.

In many instances the blower B above described may be adequate to accomplish the desired results where built of sufficient capacity, but where a single blower is inadequate a second blower E similar to the blower B may be installed in conjunction and in line with the exhaust of the latter, the blower E being fitted with an air intake 27 disposed opposite to and spaced a short distance from the open outer end of the discharge conduit 22 of the blower B so that blower E will induct such gases and substances as are exhausted from the blower B, together with a supply of atmospheric air. The blower E is fitted with a fan C', an operating shaft 12', a driving means 14', a water supply pipe 23', sprinkler 25' and a water drain pipe 26'. Any suitable number of the blowers may thus be arranged in series or tandem with the inlets and outlets of adjacent blowers disposed in register.

In the operation of the invention hot products of combustion generated in a furnace, stove or incinerator (not shown) are directed to discharge through the vent or flue A, and on setting the blower B in operation, such products are inducted into the combustion chamber D together with atmospheric air through the intake 21 by the action of the revolving fan blades 9 of the blower B in the manner common to blowers of the character here shown; the blades 9 being rotated at high speed as through the pulley 14 from any suitable motive power.

The products eminating from the vent or flue A and delivered to the conduit 18 usually contain unburned combustibles, such as carbon (soot) and gas, which are non-combusted for lack of air (oxygen) to support combustion. By inducting air into the hot products entering the combustion chamber D these combustibles are caused to burn. The chamber D is formed of such diameter and length as to insure burning of at least the major portion of the combustibles delivered thereto so that when the products enter the blower they will be substantially free of combustibles.

The products on being delivered into the blower housing by the action of the blower blades will be forcibly met by an incoming flow of air delivered to the blower housing through the intake 15. Such air will intermingle with the hot gas now substantially free of combustibles and by reason of such air being of a temperature greatly less than that of the hot products of combustion will effect a rapid cooling and consequent contraction of such products as they flow into and through the blower housing. In this fashion the hot products of combustion are diluted with air and are subjected to an initial cooling and contracting action preliminary to their contact with the blower blades.

The products of combustion consisting of gases, vapors, fumes and suspended solid particles principally ash, together with the air stream, thus pass into the blower B at a temperature considerably less than that of the generated products of combustion, which reduction of temperature will be determined by the relative temperatures and volumes of the products of combustion and the air admixed therewith.

The products of combustion and air mixture on entering the blower housing will immediately be subjected to a further cooling and contracting action as well as to a scrubbing action by reason of being brought into intimate forceable contact with minute masses of water splattered by impact of the rapidly advancing blades 9 on the streams of water being delivered into the blower from the sprinkler 25, the water having a normal cool temperature which will be considerably less than the gaseous mixture being acted on in the blower. The actions occuring within the blower may be complex and involved and may vary considerably according to variations in the character of the gases, liquids and solids being worked as well as to variations in temperature, duration of contact or the time element involved.

However, in general, what primarily occurs in the blower when in operation, is subjecting the water delivered into the blower to impacts of the blower blades in the presence of the heated gaseous mixture of air and combustion products; the water and gases being thus brought into forceable contact while confined within the space housed by the blower which results in a maximum of absorption in the water of the water soluble gas content and of solids held in suspension in the gases, which occurs at high speed due to the speed of travel of the blower blades.

The water delivered into the blower is thus saturated with water soluble gases and flows to discharge from the blower through the drain outlet 22 and carrying therewith the solid particles precipitated from the fluids being worked, while air and non-absorbed gases flow to discharge from the blower outlet 22 to be reacted on by the succeeding blower E or blowers if need be.

The water supplied to the blower thus serves as a means of eliminating certain noxious gases, vapors and fumes contained in the products of combustion as well as serving as a means for collecting and disposing of the solid particle content of such products. A further function of the water is its cooling action on the gases resulting in contraction thereof and also its cooling action on the blower; the continuous flow of water under impacts on the blades and their mounting and on the walls of the blower housing serving to absorb heat therefrom such as to prevent overheating thereof. The water delivered to the blower thus cooperates with the incoming air at atmospheric temperature to effect rapid reduction of the temperature of the products of combustion entering and passing through the blower.

Cooling of the hot gases greatly reduces their volume which is compensated for by the air entering the blower, through the opening 15 in the blower side wall 8.

A further important action of the incoming water is the washing of the fan blades and the prevention of accumulation of solids thereon which interfere with the efficiency of the blower.

Ultimately non-absorbed gases of combustion with associated air will be discharged from a unit or chain of units into the surrounding atmosphere. It is desirable that such discharged mixture be of a temperature at or approximately at the temperature of the surrounding atmosphere so that there will be an immediate mingling and absorption of the discharged gases with atmosphere. For this reason it is generally necessary to employ a chain of such number of the blower units as will effect the desired reduction of temperature of the gases under treatment. Furthermore the absorption of gases in the water occurs most effectively when the water and water soluble gases are at or substantially at, corresponding temperatures and accordingly by providing a series of the blowers and passing the gases successively therethrough there will be at least one blower in which the gases and water will be at a temperature for most effective gas absorption.

By the use of the invention the unburned combustibles in the generated hot products of combustion are initially subjected to a combustion action by the introduction therein and intermingling therewith of atmospheric air, and then caused to be impacted by water and air forcibly impacted thereagainst in the blower whereby a cooling and contracting action is effected and whereby solids are separated from the mixture in the blower, and at least a portion of water-soluble gases and vapors or fumes contained in the products of combustion are absorbed in the water and eliminated together with the solids by being carried to discharge in combination with the water, while other gases of the products of combustion are carried forward with the air either to discharge or for further treatment; and the non-soluble gases, consisting in most part of the nitrogen content of the products of combustion intermixed with air ultimately being delivered to atmosphere in a cooled state.

Manifestly the invention is applicable to various smoke producing combustion apparatus wherever the elimination of smoke and smog is desirable.

While I have shown and described a specific embodiment of my invention, I do not limit myself to the exact details of construction set forth, and the invention embraces such changes, modifications and equivalents of the parts and their formation and arrangement as come within the purview of the appended claims. This application is a continuation-in-part of application Serial Number 281,215 filed by me April 8, 1952, now abandoned.

The invention is designed to be installed at the outlet of a flue or smoke vent in lieu of a smoke-stack or chimney and thus serve to eliminate the use of such structures and the hazards incident thereto.

I claim:

1. In an apparatus for eliminating products of combustion, a blower having an air inlet at one end thereof, and a products of combustion intake at its other end, said blower also having a discharge outlet and including revoluble blades, a conduit connected at one end thereof to the products of combustion intake and having its other end open to atmosphere, a flue for directing hot products of combustion into the open end of said conduit, said conduit having an inner diameter throughout exceeding that of said flue to form a combustion chamber, said blades being operable to induct such products of combustion and air into and through said conduit and intake and to advance gases through the blower to discharge through the blower outlet; means for delivering air through said air inlet to effect a cooling and diluting action on gases entering said intake; means for delivering water to the interior of said blower into the path of travel of said blades, whereby certain gases and solids will be absorbed by the water, and a drain in said blower for carrying off the saturated water.

2. In an apparatus for separating products of combustion embodying a plurality of in-line blowers including a leading blower and a succeeding blower each having an intake and an outlet and including revoluble blades adapted to induct gases into the intake and to advance the gases through the blower to discharge through the outlet thereof, a conduit enclosing a combustion chamber directly connected to the intake of the lead blower having an open outer end adapted to be disposed opposite the discharge end of a smoke vent in spaced but proximate relation thereto whereby products of combustion from the smoke vent and air from surrounding atmosphere will be inducted into said combustion chamber and the products passed through the leading blower on rotation of the blades therein; said succeeding blower having its intake open to atmosphere and arranged directly opposite the outlet of the leading blower in spaced but proximate relation thereto whereby on rotation of the blades in said succeeding blower gases discharged from the leading blower will be inducted into said blower through said intake together with air so as to reduce the temperature of the gases delivered to said blower, means for delivering a cooling stream of water into each of said blowers in the path of travel of said blades whereby on rotation of said blades the delivered water will be forcibly impacted by the blades and caused to bombard the gases passing through the blowers, and means for exhausting water from said blowers.

3. In an apparatus for eliminating products of combustion, a smoke flue having an open discharge end, a blower having a products of combustion intake, a conduit leading from said intake enclosing a combustion chamber and having an outer end opening to atmosphere and presented to the open outer end of said smoke flue, said conduit having an internal diameter throughout exceeding that of said flue; said blower including revoluble blades for advancing gases through the blower and for inducting combustion products from said flue together with air from the outer end of said conduit into and through said combustion chamber and into said blower through said intake; means for delivering streams of water to the interior of said blower into the path of travel of said blades whereby the water will be impacted and splattered by said blades in the presence of products of combustion within the blower, said blower having an air inlet opposite the products of combustion intake, and fan blades arranged to forcibly direct air into said air inlet.

4. In an apparatus for eliminating products of combustion, a blower embodying a pair of parallel end walls one of which is formed with a products of combustion intake and the other of which is formed with an air inlet arranged opposite said intake, a side wall connected to said end walls having a discharge outlet, said blower including a revoluble shaft extending axially of said intake and inlet and carrying blades for advancing gases through said blower from said intake and inlet through said outlet; means for rotating said shaft; a combustion chamber opening directly to said intake having an open end, a smoke flue discharging into said open end in spaced relation thereto for delivering hot products of combustion to said combustion chamber, said blower being operable to induct the products of combustion through said combustion chamber together with air entering the latter through its open end and to induct resultant gases through said intake and direct them through said discharge outlet; fan blades on said shaft arranged to forcibly direct air inwardly through said inlet in opposition to hot gases inducted through said intake to effect cooling and dilution of the hot gases in said blower; means for delivering streams of water to the interior of said blower into the path of travel of said blades whereby water will be impacted and splattered by said blades in the presence of the mixture of products of combustion and air within said blower, and a drain in said blower for carrying off the water delivered thereto.

5. In an apparatus for eliminating products of combustion embodying a blower having a cylindrical side wall and parallel end walls joined to the ends of said side wall; one of said end walls having a central gas intake opening and the other of said end walls having an air inlet opening arranged opposite said intake opening, said side wall being fitted with a discharge outlet, an elongated conduit having one end thereof opening to said blower through said intake opening and connected to the end wall surrounding the latter, said conduit having its other end open to atmosphere and terminating in a venturi shaped throat, a smoke flue having a discharge end of a diameter less than said throat and opening to the latter for delivering products of combustion to said conduit through said throat, said conduit having an internal diameter throughout exceeding that of said smoke flue and serving as a combustion chamber leading to said blower intake; a rotary shaft extending into said blower through said air inlet; means for rotating said shaft, a series of blades mounted on said shaft between said end walls and arranged to induct air into the open end of said conduit together with products of combustion from said flue and induct resultant admixture of gases through said intake and to direct the gases to and through said discharge outlet; fan blades on said shaft exteriorly of said blower operable on rotation of said shaft to forcibly direct air into said blower through said inlet against gases entering the blower through said intake to effect cooling and dilution of the gases in said blower; means for delivering streams of cold water into the path of travel of the blades in said blower whereby the water will be impacted and splattered by said blades to effect a washing and cooling action on products of combustion within said blower, and a drain in the lower portion of said blower for carrying off the water delivered thereto.

References Cited in the file of this patent

UNITED STATES PATENTS

| | | |
|---|---|---|
| 638,983 | Osborne | Dec. 12, 1899 |
| 991,157 | Kestner | May 2, 1911 |
| 1,843,999 | White | Feb. 9, 1932 |
| 2,005,249 | Tietig | June 18, 1935 |
| 2,653,674 | Ortgies | Sept. 29, 1953 |